(12) United States Patent
Chung et al.

(10) Patent No.: US 8,491,866 B2
(45) Date of Patent: *Jul. 23, 2013

(54) PROCESS FOR PREPARATION OF SILVER OXIDE

(75) Inventors: Kwang Choon Chung, Yongin-si (KR); Hyun Nam Cho, Gunpo-si (KR); Ji Hoon Yoo, Bucheon-si (KR); Kee In Son, Seoul (KR)

(73) Assignee: Inktec Co., Ltd. (KR)

( * ) Notice: Subject to any disclaimer, the term of this patent is extended or adjusted under 35 U.S.C. 154(b) by 308 days.

This patent is subject to a terminal disclaimer.

(21) Appl. No.: 12/746,330

(22) PCT Filed: Dec. 4, 2008

(86) PCT No.: PCT/KR2008/007166
§ 371 (c)(1),
(2), (4) Date: Jun. 4, 2010

(87) PCT Pub. No.: WO2009/072820
PCT Pub. Date: Jun. 11, 2009

(65) Prior Publication Data
US 2010/0247422 A1  Sep. 30, 2010

(30) Foreign Application Priority Data
Dec. 7, 2007 (KR) .................. 10-2007-0126902

(51) Int. Cl.
*C07F 1/00* (2006.01)
(52) U.S. Cl.
USPC ........................................ 423/604
(58) Field of Classification Search
USPC ........................................ 423/604
See application file for complete search history.

(56) References Cited

U.S. PATENT DOCUMENTS

| 4,542,214 | A | 9/1985 | Bechara | |
|---|---|---|---|---|
| 7,691,294 | B2 * | 4/2010 | Chung et al. | 252/500 |
| 7,955,528 | B2 * | 6/2011 | Chung et al. | 252/512 |
| 2008/0206488 | A1 * | 8/2008 | Chung et al. | 427/596 |
| 2009/0120800 | A1 * | 5/2009 | Chung et al. | 205/263 |
| 2009/0220696 | A1 * | 9/2009 | Chung et al. | 427/258 |
| 2009/0324739 | A1 * | 12/2009 | Chung et al. | 424/618 |
| 2010/0189901 | A1 * | 7/2010 | Chung et al. | 427/256 |

FOREIGN PATENT DOCUMENTS

| JP | 62-297213 | | 12/1987 |
|---|---|---|---|
| KR | 10-2006-0112025 | | 10/2006 |
| WO | 2006/001018 | | 1/2006 |
| WO | 2006/083153 | * | 8/2006 |
| WO | 2006/093398 | * | 9/2006 |

OTHER PUBLICATIONS

International Search Report—PCT/KR2008/007166 dated Jun. 18, 2009.

* cited by examiner

*Primary Examiner* — Steven Bos
(74) *Attorney, Agent, or Firm* — Cantor Colburn LLP

(57) ABSTRACT

The present invention relates to a process for preparation of silver oxide with various shape and size using a silver complex compound having a special structure. The present invention includes 1) step of preparing a precursor solution including a silver complex compound obtained by reacting a silver compound with one or more mixture selected from the group consisting of an ammonium carbamate-based compound, an ammonium carbonate-based compound or an ammonium bicarbonate-based compound in the presence of a solvent; and 2) step of preparing silver oxide by reacting the precursor solution including the silver complex compound of step 1) with an oxidant. The shape and particle size of the silver oxide prepared according to the preparation process of the present invention can be changed.

16 Claims, 3 Drawing Sheets

PROCESS FOR PREPARATION OF SILVER OXIDE

TECHNICAL FIELD

The present invention relates to a process for preparation of silver oxide with various shape and size by reacting a silver complex compound having a special structure with an oxidant.

BACKGROUND ART

Ulmann's Encyclopedia of Ind. Chem., Vol. A24, 107 (1993) discloses that since silver, which is precious metal, is not easily oxidized but has excellent electric and thermal conductivity and further has a catalyst, an antibacterial activity and so on, silver compound such as silver (Ag) and silver oxide has been widely used in the industry overall such as electrode material, alloys, platings, medicaments, photographs, electric/electronics, fibers, detergents, home appliances, and so on.

Silver oxide is a compound stable at a normal temperature, but has a feature that it is reduced into silver (Ag) using a decomposition by heating. A reduction reaction begins at 160° C., however the silver oxide having a slow response speed is required to be heated at 400° C. or more in order to give conductivity after the reduction is completed.

Japanese Patent Laid-Open No. Sho 56-69309 discloses the method to prepare silver oxide by adding aqueous silver nitrate ($AgNO_3$) solution into aqueous sodium hydroxide (NaOH) solution and then precipitating it. However, this method has disadvantage in that it is difficult to be dispersed and reduced at a low temperature due to aggregation. And, U.S. Pat. No. 7,201,888 discloses the method to prepare nano-sized silver oxide using silver nitrate ($AgNO_3$) and sodium hydroxide (NaOH) as oxidant and using fatty acid as surfactant on aqueous solution. However, this method fails to disclose a method to prepare particles of various shapes.

DISCLOSURE

Technical Problem

Therefore, in order to solve the problems, an object of the present invention is to provide a process for preparation of silver oxide having various shapes and sizes by reacting a silver complex compound having a special structure with an oxidant.

Another object of the present invention is to provide a method to control shapes and sizes of silver oxide to be prepared through the sort of oxidant and the change of content in oxidant used in preparing the silver oxide.

Technical Solution

To achieve the above object, the present invention, which provides a process for preparation of silver oxide having various shapes and sizes, is characterized in that the silver oxide having various shapes and sizes is prepared by reacting a silver complex compound having a special structure with an oxidant.

Hereinafter, the method will be described for each step.

1) Step of preparing a precursor solution including a silver complex compound obtained by reacting a silver compound with a mixture of at least one selected from the group consisting of an ammonium carbamate-based compound, an ammonium carbonate-based compound or an ammonium bicarbonate-based compound in the presence of a solvent; and 2) Step of preparing silver oxide by reacting the precursor solution including the silver complex compound of step 1) with an oxidant.

Step 1): Preparation of a Precursor Solution Including a Silver Complex Compound Having a Special Structure A silver complex compound used for preparing silver oxide having various shapes and sizes is prepared by reacting a silver compound represented by the formula 1 below with one or more mixture selected from the group consisting of an ammonium carbamate-based compound, an ammonium carbonate-based compound or an ammonium bicarbonate-based compound represented by the formula 2, 3 or 4 below in the presence of a solvent.

[In the formula 1, n is an integer from 1 to 4 and X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and derivatives thereof.]

[In the formulas 2 to 4, $R_1$, $R_2$, $R_3$, $R_4$, $R_5$ and $R_6$ is hydrogen, aliphatic or cycloaliphatic (C1-C30) alkyl group, (C6-C20) aryl group, (C6-C20) aryloxy group, (C6-C20) ar (C1-C30) alkyl group, tri(C1-C30) alkylsilyl group, tri(C1-C30) alkoxy silyl group, tri(C6-C20) arylsilyl group, allyl group, or 3-membered to 7-membered heterocyclic compound group, polymer compound group, hydroxyl group, (C1-C30) alkoxy group, (C1-C30) alkylamino group, independently from each other, or $R_1$ and $R_2$ or $R_4$ and $R_5$ may be bonded independently from each other by (C2-C6) alkylene, which includes or does not include hetero atom, to form a ring, the alkyl group or aryl group of $R_1$, $R_2$, $R_3$, $R_4$, $R_5$ and $R_6$ may further be substituted by aliphatic or cycloaliphatic (C1-C30) alkyl, (C1-C30) alkioxy, cyano, hydroxy, amino, (C6-C20) aryl, tri(C1-C30) alkylsilyl, tri (C1-C30) alkoxysilyl, tri(C6-C20) aryl silyl, allyl or carboxylic acid.]

The silver compound represented by the formula 1 is, for example, one or more mixture selected from the group consisting of silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof. However, the silver compound is not limited thereto.

Each substituent of $R_1$, $R_2$, $R_3$, $R_4$, $R_5$ and $R_6$ of the ammonium carbamate-based compound, the ammonium carbonate-based compound or the ammonium bicarbonate-based compound represented by the formula 2, 3 or 4 can be independently selected from the group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxypropyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tollyl, benzyl, derivatives thereof, polymer compounds such as polyallylamine and polyethyleneimine and derivatives thereof. However, they are not limited specifically thereto.

Specific examples of the ammonium carbamate-based compound represented by the formula 2 are one or more mixture selected from the group consisting of ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, benzylammonium benzylcarbamate, triethoxysilylpropylammonium triethoxysilylpropylcarbamate and derivatives thereof. Specific examples of the ammonium carbonate-based compound represented by the formula 3 are one or more mixture selected from the group consisting of ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and derivatives thereof. Specific examples of the ammonium bicarbonate-based compound represented by the formula 4 are one or more mixture selected from the group consisting of ammonium bicarbonate, isopropylammonium bicarbonate, t-butylammonium bicarbonate, 2-ethylhexylammonium2-methoxyethylammonium bicarbonate, 2-cyanoethylammonium bicarbonate, dioctadecylammonium bicarbonate, pyridinium bicarbonate, triethylenediaminium bicarbonate and derivatives thereof.

Meanwhile, the preparation method and the sort of the ammonium carbamate-based compound, the ammonium carbonate-based compound or the ammonium bicarbonate-based compound are not particularly limited. For example, the ammonium carbamate-based compound may be prepared from a primary amine, a secondary amine, a tertiary amine or a mixture of at least one thereof and carbon dioxide, as disclosed in U.S. Pat. No. 4,542,214 (Sep. 17, 1985). An ammonium carbonate-based compound is obtained if 0.5 mole of water is used per 1 mole of amine and an ammonium bicarbonate-based compound is obtained when 1 mole or more of water is used. At this time, the preparation may be performed under normal pressure or applied pressure without a solvent or in the presence of such solvent as water, alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methyl ethyl ketone and acetone, hydrocarbons like hexane and heptane, aromatic solvents like benzene and toluene and halogen-substituted solvents like chloroform, methylene chloride and carbon tetrachloride or a mixture thereof. The carbon dioxide may be bubbled in gas phase or used in the form of dry ice. Alternatively, the preparation may be performed in the supercritical phase. Any other known methods can be applied in the preparation of the ammonium carbamate-based derivative, the ammonium carbonate-based derivative or the ammonium bicarbonate-based derivative used in the present invention, as long as the final structure is the same. That is, solvent, reaction temperature, concentration, catalyst, etc. are not particularly limited in the preparation. Nor the preparation yield is particularly limited.

A silver complex compound can be prepared by reacting the silver compound prepared as above with the ammonium carbamate-based compound, the ammonium carbonate-based compound or the ammonium bicarbonate-based compound prepared as above. For example, at least one silver compound represented by the formula 1 and the ammonium carbamate-based compound, the ammonium carbonate-based compound or the ammonium bicarbonate-based compound represented by the formulas 2, 3 or 4 or the mixture thereof are reacted under nitrogen atmosphere at normal pressure or applied pressure without a solvent or in the presence of such solvent as water, alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methyl ethyl ketone and acetone, aliphatic hydrocarbons like hexane and heptane, aromatic solvents like benzene and toluene and halogen-substituted solvents like chloroform, methylene chloride and carbon tetrachloride or a mixture thereof.

The precursor solution including the silver complex compound of step 1) may further include a dispersing agent to effectively disperse particles. For example, 4000 series of EFKA, Disperbyk series of BYK, Solsperse series of Avecia, TEGO Dispers series of Degussa, Disperse-AYD series of Elementis, JONCRYL series of Johnson Polymer, etc. may be used for this purpose. And, the dispersing agent is a mixture of at least one selected from the group consisting of resin; surfactant; an amine compound selected from a primary amine, a secondary amine or a tertiary amine; the ammonium carbamate-based compound represented by the formula 2; the ammonium carbonate-based compound represented by the formula 3; the ammonium bicarbonate-based compound represented by the formula 4; a phosphorus compounds like phosphine or phosphate; a sulfur compound like thiol or sulfide; and fatty acid.

More specifically, the resin may be selected and used at least one of an acryl resin such as polyacrylic acid and polyacrylic acid ester, a cellulose resin such as ethyl cellulose, cellulose ester and cellulose nitrate, an aliphatic or copolymer polyester resin, a vinyl resin such as polyvinylbutyral, polyvinylacetate and polyvinylpyrrolidone, a polyamide resin, a polyurethane resin, a polyether resin, a urea resin, an alkyd resin, a silicone resin, a fluorine resin, an olefin resin such as polyethylene and polystyrene, a thermoplastic resin such as petroleum and rosin, an epoxy resin, an unsaturated or vinyl polyester resin, a diallylphthalate resin, a phenol resin, an oxetane resin, an oxazine resin, a bismaleimide resin, a modified silicone resin such as silicone epoxy and silicone polyester, a thermosetting resin such as melamine, an acryl resin hardened by UV or electron beam, ethylene-propylene rubber (EPR), styrene-butadiene rubber (SBR) or a natural polymer such as starch and gelatin.

Also, the surfactant may be an anionic surfactant such as sodium lauryl sulfate, a nonionic surfactant such as nonylphenoxypolyethoxyethanol and FSN of Dupont, a cationic surfactant such as laurylbenzylammonium chloride or an amphoteric surfactant such as lauryl betaine and coco betaine.

Specific examples of the amine compound may be methylamine, ethylamine, n-propylamine, isopropylamine, n-butylamine, isobutylamine, isoamylamine, n-hexylamine, 2-ethylhexylamine, n-heptylamine, n-octylamine, isooctylamine, nonylamine, decylamine, dodecylamine, hexadecylamine, octadecylamine, docodecylamine, cyclopropylamine, cyclopentylamine, cyclohexylamine, allylamine, hydroxylamine, ammonium hydroxide, methoxyamine, 2-ethanolamine, methoxyethylamine, 2-hydroxypropylamine, methoxypropylamine, cyanoethylamine, ethoxyamine, n-butoxyamine, 2-hexyloxyamine, methoxyethoxyethylamine, methoxyethoxyethoxyethylamine, diethylamine, dipropylamine, diethanolamine, hexamethyleneimine, morpholine, piperidine, piperazine, ethylenediamine, propylenediamine, hexamethylenediamine, triethylenediamine, 2,2-(ethylenedioxy)bisethylamine, triethylamine, triethanolamine, pyrrole, imidazole, pyridine, aminoacetaldehyde dimethyl acetal, 3-aminopropyltrimethoxysilane, 3-aminopropyltriethoxysilane, aminobenzonitrile, benzylamine, derivatives thereof and such polymer compounds as polyallylamine and polyethyleneimine or derivatives thereof. Specific examples of the ammonium compound are ammonium carbamate-based compounds such as ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylcarbamate, benzylammonium benzylcarbamate, triethoxysilylpropylammonium triethoxysilylpropylcarbamate and derivatives thereof, such ammonium carbonate-based compounds as ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and derivatives thereof, and such ammonium bicarbonate-based compounds as ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and derivatives thereof. Also, the phosphorus compound may be one represented by the general formula $R_3P$, $(RO)_3P$ or $(RO)_3PO$, where R is a linear or branched (C1-C20) alkyl group or a (C6-C20)aryl group, Typical examples of such phosphorus compound are tributylphosphine, triphenylphosphine, triethylphosphite and triphenylphosphite, etc. And, the sulfur compound may be butanethiol, n-hexanethiol, diethyl sulfide, tetrahydrothiophene, etc. Also, the fatty acid may be palmitic acid, stearic acid, oleic acid or linoleic acid, etc. The usage mount thereof is not particularly limited.

The content of silver in the precursor solution including the silver complex compound having the special structure used in the present invention is not particularly limited. However, it is preferable that its content is 0.1 to 50 wt %, more preferably 1 to 30 wt %. The usage amount of the dispersing agent is not particularly limited, either. However, it is preferable that its usage amount is 0.1 to 10 wt %, more preferably 0.5 to 5 wt % of the contained silver.

2) Step of preparing silver oxide by reacting a precursor solution including the silver complex compound of step 1) with an oxidant.

Step 2): Preparation of Silver Oxide by Oxidizing the Silver Complex Compound Prepared by Reacting the Precursor Solution Including the Silver Complex Compound of Step 1) with the Oxidant The oxidant may be diluted using a diluent and the usage amount of the oxidant is not particularly limited. However, the oxidant has an equivalent of 0.1 to 10, more preferably 1.5 to 5 by mole number of silver in the precursor solution including the silver complex compound of step 1).

The oxidant may be an oxidative gas such as air, oxygen and ozone, a strong basic-alkali or alkaline earth metal compound such as NaOH, KOH, $Ca(OH)_2$ or a mixture thereof, a peroxide such as hydrogen peroxide ($H_2O_2$), $K_2S_2O_8$, $NaBO_3$, $KO_2$, $Na_2O_2$, $(NH_4)_2S_2O_8$, $Na_2S_2O_8$, $KHSO_5$, $H_2SO_5$, $(CH_3)_3CO_2H$, and $C_6H_5CO_2)_2$ etc., a peroxy acid such as $HCO_3H$, $CH_3CO_3H$, $CF_3CO_3H$, $C_6H_5CO_3H$, and m-$ClC_6H_5CO_3H$ etc., an alkaline metal alkoxide such as $NaOCH_3$ and $NaOCH_2CH_3$ etc., a generally known oxidative inorganic acid such as nitric acid, sulfuric acid, $I_2$, $FeCl_3$, $Fe(NO_3)_3$, $Fe_2(SO_4)_3$, $K_3Fe(CN)_6$, $(NH_4)_2Fe(SO_4)_2$, $Ce(NH_4)_4(SO_4)_4$, $NaIO_4$, $KMnO_4$, and $K_2CrO_4$ etc., a metal or a nonmetal compound. The oxidant may be used either alone or in combination of at least one thereof. However, the oxidant is not particularly limited thereto.

The shape and particle size of the silver oxide are changed according to the sort, concentration, mixing ratio, and mixing method of the oxidant used in the present invention.

As the diluent in the oxidation step, water, an alcohol such as methanol, ethanol, isopropanol, 1-methoxypropanol, butanol, ethylhexyl alcohol and terpineol, a glycol such as ethylene glycol and glycerine, an acetate such as ethyl acetate, butyl acetate, methoxypropyl acetate, carbitol acetate and ethylcarbitol acetate, an ether such as methylcellosolve, butylcellosolve, diethyl ether, tetrahydrofuran and dioxane, a ketone such as methyl ethyl ketone, acetone, dimethylformamide and 1-methyl-2-pyrrolidone, a hydrocarbon such as hexane, heptane, dodecane, and paraffin oil, an aromatic solvent such as benzene, toluene and xylene, a halogen-substituted solvent such as chloroform, methylene chloride and carbon tetrachloride, acetonitrile, dimethylsulfoxide or a mixture thereof may be used. The diluent is not particularly limited thereto.

The silver oxide prepared based the process for preparation of the silver oxide according to the present invention has various shapes such as a sphere or a rod, etc., and various sizes of 100 to 500 nm, and further has excellent dispersibility, making it possible to be utilized as raw material for electronic materials, an antibacterial agent, a reaction catalyst, and a secondary battery, etc.

DESCRIPTION OF DRAWINGS

The above and other objects, features and advantages of the present invention will become apparent from the following description of preferred embodiments given in conjunction with the accompanying drawings, in which.

BEST MODE

Hereinafter, the present invention is described in further detail referring to the examples. However, it will be appreciate that those skilled in the art, in consideration of this disclosure, may make modifications and improvements within the spirit and scope of the present invention.

Example 1

Figure 1:
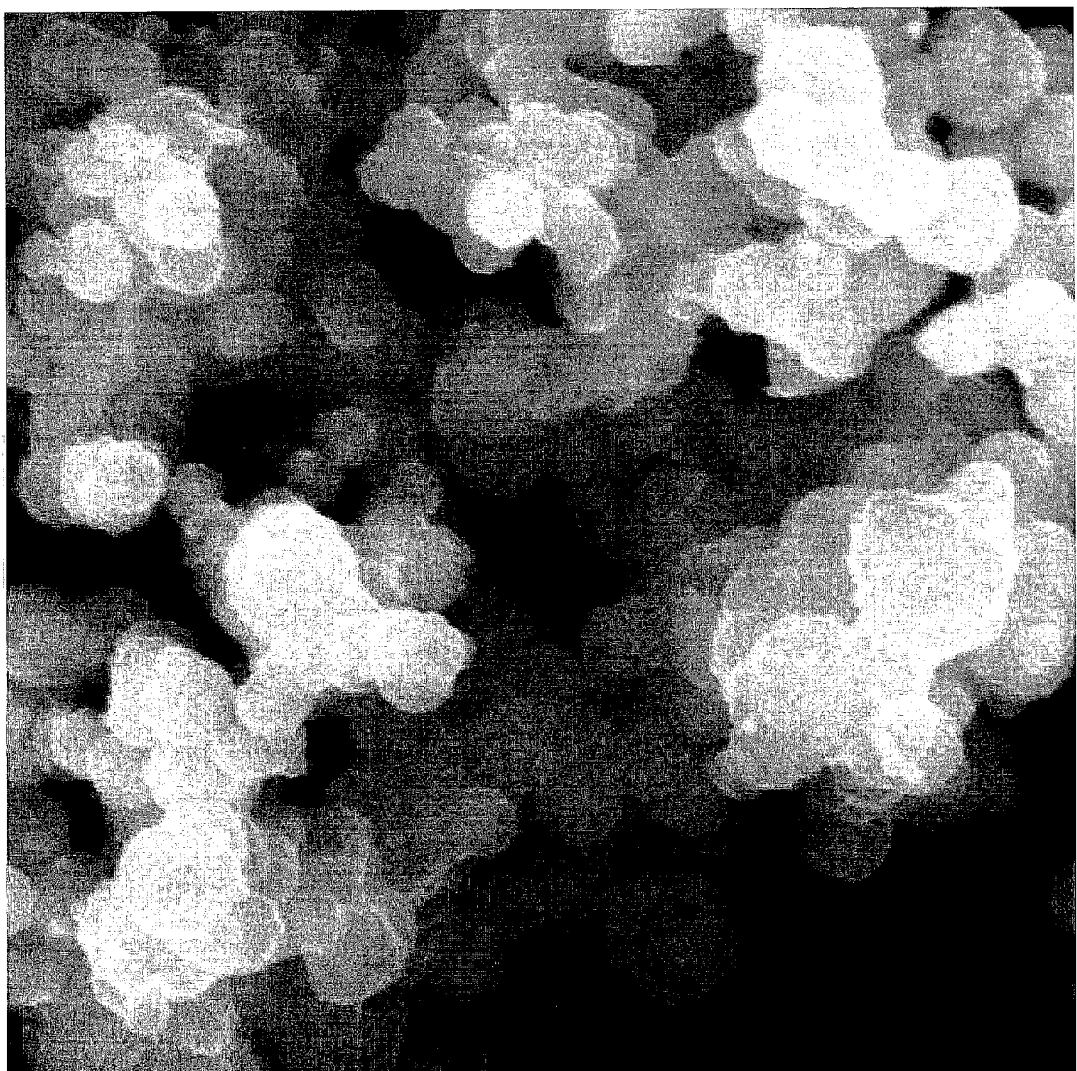
FIG. 1 is the SEM image for the silver oxide of Example 1.

41.98 g (56 mmol) of 2-ethylhexylammonium 2-ethylhexylcarbamate and 0.25 g of isopropylammonium isopropylcarbamate as a dispersing agent were dissolved in 77.7 g of ethanol in a reactor equipped with a stirrer. Then, 5.36 g (23 mmol) of silver oxide (Kojima Chemical Co., Ltd) was added and reaction was performed at room temperature. At first, a black slurry was obtained, but as the complex was formed, the color faded gradually to be transparent. Finally, a colorless, transparent solution was obtained, after 2 hours of reacting. 100 g of ethanol in which 5.2 g (93 mmol) of KOH was dissolved was slowly added thereto for 1 hour. As the reaction proceeded in the transparent state, the reaction solution turned into a light brown slurry and finally into a dark brown slurry after the reaction was completed. The particles of the slurry were filtered using a filter paper to be washed using ethanol until unreacted silver complex compound and oxidant were completely removed, and then was decompressed under a vacuum drying oven at constant temperature of 40° C. to completely remove solvents, thereby preparing a spherical shaped silver oxide having a size of 200-500 nm. The SEM photograph of the silver oxide is shown in FIG. 1.

Example 2

Figure 2:
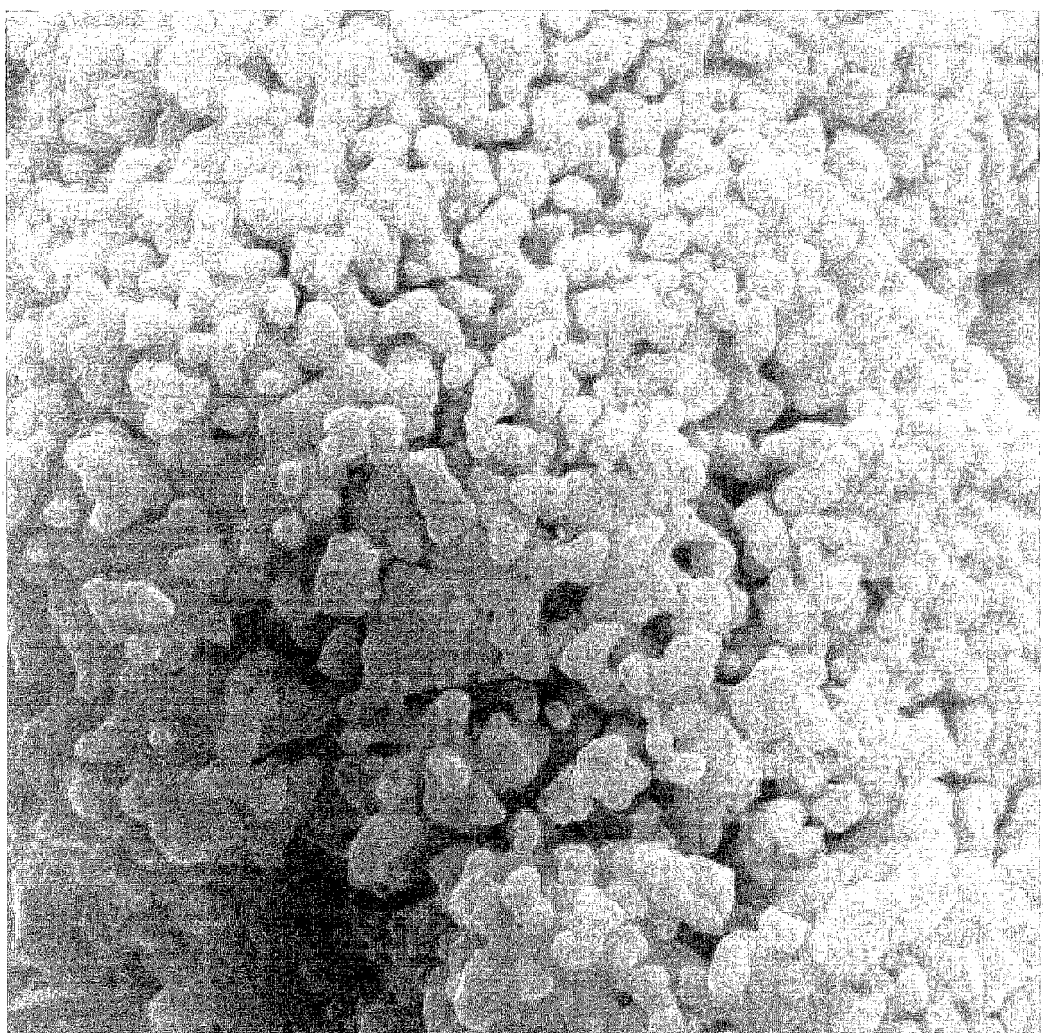
FIG. 2 is the SEM image for the silver oxide of Example 2.

41.98 g (56 mmol) of 2-ethylhexylammonium 2-ethylhexylcarbamate and 0.25 g of isopropylammonium isopropylcarbamate as a dispersing agent were dissolved in 77.7 g of ethanol in a reactor equipped with a stirrer. Then, 5.36 g (23 mmol) of silver oxide (Technic Inc.) was added and reaction was performed at room temperature. At first, a black slurry was obtained, but as the complex was formed, the color faded gradually to be transparent. Finally, a colorless, transparent solution was obtained, after 2 hours of reacting. 100 g of ethanol in which 3.7 g (93 mmol) of NaOH was dissolved was slowly added thereto for 1 hour. As the reaction proceeded in the transparent state, the reaction solution turned into a light brown slurry and finally into a dark brown slurry after the reaction was completed. The particles of the slurry were filtered using a filter paper to be washed using ethanol until unreacted silver complex compound and oxidant were completely removed, and then was decompressed under a vacuum drying oven at constant temperature of 40° C. to completely remove solvents, thereby preparing a spherical shaped silver oxide having a size of 100-300 nm. The SEM photograph of the silver oxide is shown in FIG. 2.

Example 3

41.98 g (56 mmol) of 2-ethylhexylammonium 2-ethylhexylcarbamate and 0.25 g of isopropylammonium isopropylcarbamate as a dispersing agent were dissolved in 77.7 g of ethanol in a reactor equipped with a stirrer. Then, 5.36 g (23 mmol) of silver oxide (Kojima Chemical Co., Ltd.) was added and reaction was performed at room temperature. At first, a black slurry was obtained, but as the complex was formed, the color faded gradually to be transparent. Finally, a colorless, transparent solution was obtained, after 2 hours of reacting. 100 g of ethanol in which 2.6 g (46.5 mmol) of KOH and 1.9 g (46.5 mmol) of NaOH were dissolved was slowly added thereto for 1 hour. As the reaction proceeded in the transparent state, the reaction solution turned into a light brown slurry and finally into a dark brown slurry after the reaction was completed. The particles of the slurry were filtered using a filter paper to be washed using ethanol until unreacted silver complex compound and oxidant were completely removed, and then was decompressed under a vacuum drying oven at constant temperature of 40° C. to completely remove solvents, thereby preparing a spherical shaped silver oxide having a size of 100-500 nm.

Example 4

Figure 3:
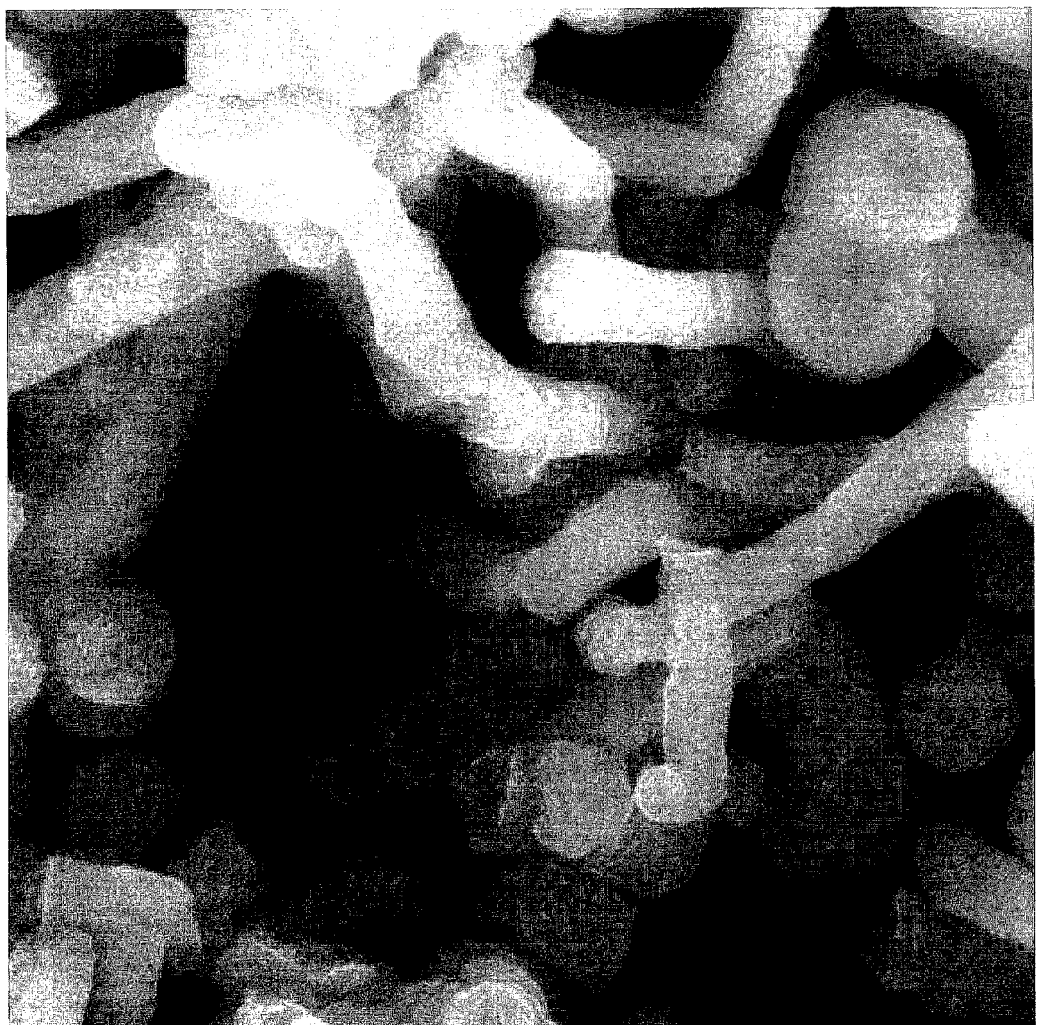
FIG. 3 is the SEM image for the silver oxide of Example 4.

A rod shaped silver oxide having a thickness of 200-300 nm was prepared in the same manner as in Example 1 by adding the same amount of oleic acid as the dispersing agent, instead of isopropylammonium isopropylcarbamate. The SEM photograph of the silver oxide is shown in FIG. 3.

Example 5

A rod shaped silver oxide having a thickness of 200-300 nm was prepared in the same manner as in Example 2 by adding the same amount of oleic acid as the dispersing agent, instead of isopropylammonium isopropylcarbamate.

Example 6

A rod shaped silver oxide having a thickness of 200-300 nm was prepared in the same manner as in Example 3 by adding the same amount of oleic acid as the dispersing agent, instead of isopropylammonium isopropylcarbamate.

Example 7

A spherical shaped silver oxide having a size of 300-500 nm was prepared in the same manner as in Example 1 after dissolving 10.66 g (56 mmol) of t-butylammonium t-butylcarbamate, instead of 2-ethylhexylammonium 2-ethylhexylcarbamate, in 83.98 g of water, instead of ethanol.

Example 8

A spherical shaped silver oxide having a size of 300-500 nm was prepared in the same manner as in Example 2 after dissolving 10.66 g (56 mmol) of t-butylammonium t-butylcarbamate, instead of 2-ethylhexylammonium 2-ethylhexylcarbamate, in 83.98 g of water, instead of ethanol.

Example 9

A spherical shaped silver oxide having a size of 300-500 nm was prepared in the same manner as in Example 3 after dissolving 10.66 g (56 mmol) of t-butylammonium t-butylcarbamate, instead of 2-ethylhexylammonium 2-ethylhexylcarbamate, in 83.98 g of water, instead of ethanol.

INDUSTRIAL APPLICABILITY

The present invention relates to a process for preparation of silver oxide, and more particularly, to a process for preparation of silver oxide fine particles of various shapes using a silver complex compound.

The silver oxide prepared according to the present invention is reduced even at low temperature of 400° C. or below and is excellent in dispersibility. The shapes and sizes of the particles thereof can be easily controlled so that a sphere or rod shaped silver oxide having a size below several hundred nanometers can be prepared by way of example.

The invention claimed is:

1. A process for preparation of silver oxide comprising:
preparing a precursor solution including a dispersing agent and a silver complex compound obtained by reacting a silver compound represented by Formula 1 below with one or more selected from an ammonium carbamate-based compound, an ammonium carbonate-based compound or an ammonium bicarbonate-based compound represented by Formula 2, 3 or 4 below in the presence of a solvent; and preparing silver oxide by reacting the precursor solution including the silver complex compound with an oxidant;

$$Ag_nX \quad \text{Formula 1}$$

in the Formula 1, n is an integer from 1 to 4 and X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and derivatives thereof,

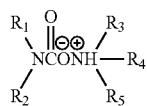

Formula 2

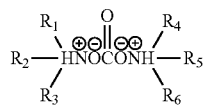

Formula 3

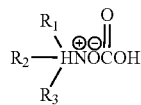

Formula 4 in the Formulas 2 to 4, $R_1$, $R_2$, $R_3$, $R_4$, $R_5$ and $R_6$ is hydrogen, aliphatic or cycloaliphatic (C1-C30) alkyl group, (C6-C20) aryl group, (C6-C20) aryloxy group, (C6-C20) ar (C1-C30) alkyl group, tri(C1-C30) alkylsilyl group, tri(C1-C30) alkoxy silyl group, tri(C6-C20) aryl silyl group, allyl group, or 3-membered to 7-membered heterocyclic compound group, polymer compound group, hydroxyl group, (C1-C30) alkoxy group, (C1-C30) alkylamino group, independently from each other, or $R_1$ and $R_2$ or $R_4$ and $R_5$ may be bonded independently from each other by (C2-C6) alkylene, which includes or does not include hetero atom, to form a ring, the alkyl group or aryl group of $R_1$, $R_2$, $R_3$, $R_4$, $R_5$ and $R_6$ may further be substituted by aliphatic or cycloaliphatic (C1-C30) alkyl, (C1-C30) alkioxy, cyano, hydroxy, amino, (C6-C20) aryl, tri (C1-C30) alkylsilyl, tri (C1-C30) alkoxysilyl, tri (C6-C20) aryl silyl, allyl or carboxylic acid.

2. The process for preparation of silver oxide according to claim 1, wherein the silver compound represented by the Formula 1 is at least one selected from the group consisting of silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof.

3. The process for preparation of silver oxide according to claim 1, wherein each substituent of $R_1$, $R_2$, $R_3$, $R_4$, $R_5$ and $R_6$ is independently selected from the group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxypropyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tollyl, benzyl, polyallylamine, polyethyleneimine and derivatives thereof.

4. The process for preparation of silver oxide according to claim 1, wherein the ammonium carbamate-based compound represented by the Formula 2 is one or more selected from the group consisting of ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, benzylammonium benzylcarbamate, triethoxysilylpropylammonium triethoxysilylpropylcarbamate and derivatives thereof; the ammonium carbonate-based compound represented by the Formula 3 is one or more selected from the group consisting of ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and derivatives thereof; and the ammonium bicarbonate-based compound represented by the Formula 4 is one or more selected from the group consisting of ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and derivatives thereof.

5. The process for preparation of silver oxide according to claim 1, wherein the solvent is at least one selected from the group consisting of water, alcohols, glycols, acetates, ethers, ketones, aliphatic hydrocarbons, aromatic solvents, and halogen-substituted solvents.

6. The process for preparation of silver oxide according to claim 5, wherein the solvent is one or more selected from the group consisting of water, methanol, ethanol, isopropanol, butanol, ethylene glycol, glycerine, ethyl acetate, butyl acetate, carbitol acetate, diethyl ether, tetrahydrofuran, dioxane, methyl ethyl ketone, acetone, hexane, heptane, benzene, toluene, chloroform, methylene chloride and carbon tetrachloride.

7. The process for preparation of silver oxide according to claim 1, wherein the dispersing agent is a mixture of at least one selected from the group consisting of resin; surfactant; an amine compound selected from a primary amine, a secondary amine or a tertiary amine; the ammonium carbamate-based compound represented by the Formula 2; the ammonium carbonate-based compound represented by the Formula 3; the ammonium bicarbonate-based compound represented by the Formula 4; a phosphorus compound; a sulfur compound; and fatty acid;

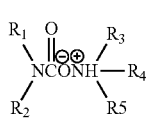

Formula 2

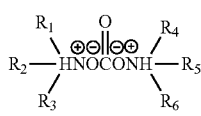

Formula 3

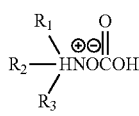

Formula 4 in the Formulas 2 to 4, $R_1$, $R_2$, $R_3$, $R_4$, $R_5$ and $R_6$ is hydrogen, aliphatic or cycloaliphatic (C1-C30) alkyl group, (C6-C20) aryl group, (C6-C20) aryloxy group, (C6-C20) ar (C1-C30) alkyl group, tri(C1-C30) alkylsilyl group, tri(C1-C30) alkoxy silyl group, tri(C6-C20) arylsilyl group, allyl group, or 3-membered to 7-membered heterocyclic compound group, polymer compound group, hydroxyl group, (C1-C30) alkoxy group, (C1-C30) alkylamino group, independently from each other, or $R_1$ and $R_2$ or $R_4$ and $R_5$ are bonded independently from each other by a (C2-C6) alkylene to form a ring, the alkyl group or aryl group of $R_1$, $R_2$, $R_3$, $R_4$, $R_5$ and $R_6$ may further be substituted by aliphatic or cycloaliphatic (C1-C30) alkyl, (C1-C30) alkioxy, cyano, hydroxy, amino, (C6-C20) aryl, tri (C1-C30) alkylsilyl, tri (C1-C30) alkoxysilyl, tri (C6-C20) aryl silyl, allyl or carboxylic acid.

8. The process for preparation of silver oxide according to claim 7, wherein the resin is at least one of an acryl resin, a cellulose resin, a polyester resin, a polyamide resin, a polyether resin, a vinyl resin, a polyurethane resin, a urea resin, an alkyd resin, a silicone resin, a fluorine resin, an olefin resin, petroleum, rosin, an epoxy resin, an unsaturated or vinyl polyester resin, a diallylphthalate resin, a phenol resin, an oxetane resin, an oxazine resin, a bismaleimide resin, a modified silicone resin melamine, an acryl resin, a styrene-butadiene rubber or a natural polymer.

9. The process for preparation of silver oxide according to claim 7, wherein the phosphorus compound is one of the Formulas 6 to 8 below, $$R_3P \qquad \text{Formula 6}$$

$$(RO)_3P \qquad \text{Formula 7}$$

$$(RO)_3PO \qquad \text{Formula 8}$$

wherein R is a linear or branched (C1-C20) alkyl group or a (C6-C20)aryl group.

10. The process for preparation of silver oxide according to claim 7, wherein the sulfur compound is selected from butanethiol, n-hexanethiol, diethyl sulfide or tetrahydrothiophene.

11. The process for preparation of silver oxide according to claim 7, wherein the fatty acid is selected from palmitic acid, stearic acid, oleic acid or linoleic acid.

12. The process for preparation of silver oxide according to claim 1, wherein the oxidant is at least one selected from the group consisting of an oxidative gas, a peroxide, a peroxy acid, an oxidative inorganic acid, an oxidative metal compound, and an oxidative nonmetal compound.

13. The process for preparation of silver oxide according to claim 12, wherein the oxidant has an equivalent of 0.1 to 10, by mole number of silver in the precursor solution including the silver complex compound.

14. The process for preparation of silver oxide according to claim 12, wherein the oxidant is at least one selected from the group consisting of oxygen, ozone, NaOH, KOH, Ca(OH)$_2$) H$_2$O$_2$, K$_2$S$_2$O$_8$, NaBO$_3$, KO$_2$, Na$_2$O$_2$, (NH$_4$)$_2$S$_2$O$_8$, Na$_2$S$_2$O$_8$, KHSO$_5$, H$_2$SO$_5$, (CH$_3$)$_3$CO$_2$H, (C$_6$H$_5$CO$_2$)$_2$, HCO$_3$H, CH$_3$CO$_3$H, CF$_3$CO$_3$H, C$_6$H$_5$CO$_3$H, m-ClC$_6$H$_5$CO$_3$H, NaOCH$_3$, NaOCH$_2$CH$_3$, nitric acid, sulfuric acid, I$_2$, FeCl$_3$, Fe(NO$_3$)$_3$, Fe$_2$(SO$_4$)$_3$, K$_3$Fe(CN)$_6$, (NH$_4$)$_2$Fe(SO$_4$)$_2$, Ce(NH$_4$)$_4$(SO$_4$)$_4$, NaIO$_4$, KMnO$_4$, and K$_2$CrO$_4$.

15. The process for preparation of silver oxide according to claim 12, wherein the oxidant is diluted with at least one solvent selected from the group consisting of water, an alcohol, a glycol, an acetate, an ether, a ketone, a hydrocarbon, an aromatic solvent, and a halogen hydrocarbon.

16. The process for preparation of silver oxide according to claim 15, wherein the solvent is at least one selected from the group consisting of water, methanol, ethanol, isopropanol, 1-methoxypropanol, butanol, ethylhexyl alcohol, terpineol, ethylene glycol, glycerine, ethyl acetate, butyl acetate, methoxypropyl acetate, carbitol acetate, ethylcarbitol acetate, methylcellosolve, butylcellosolve, diethyl ether, tetrahydrofuran, dioxane, methyl ethyl ketone, acetone, dimethylformamide, 1-methyl-2-pyrrolidone, hexane, heptane, dodecane, paraffin oil, benzene, toluene, xylene, chloroform, methylene chloride, carbon tetrachloride, acetonitrile and dimethylsulfoxide.

* * * * *